June 10, 1930.        E. S. RICHARDSON        1,763,479
DIAMOND TOOL HOLDER
Filed Sept. 13, 1927
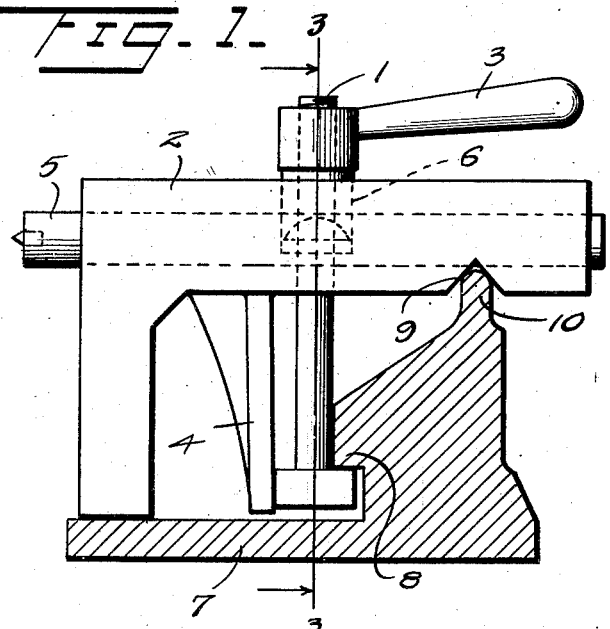
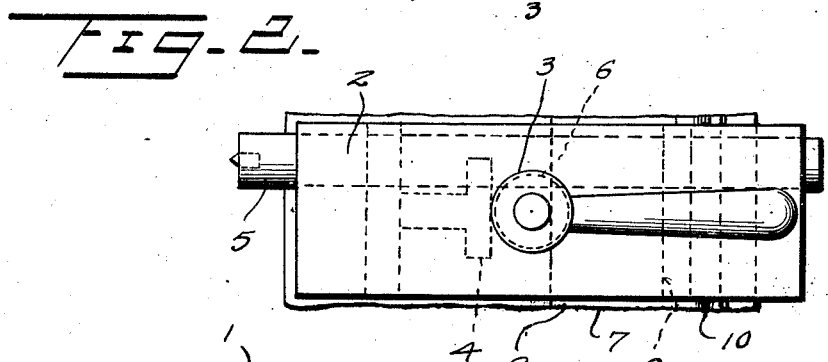
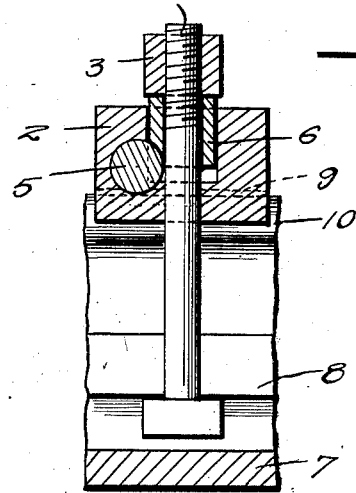
Inventor
E. S. Richardson
By Watson E. Coleman
Attorney Patented June 10, 1930

1,763,479

UNITED STATES PATENT OFFICE

ERNEST S. RICHARDSON, OF FORT WAYNE, INDIANA

DIAMOND TOOL HOLDER

Application filed September 13, 1927. Serial No. 219,290.

This invention relates to a diamond tool holder and it consists in the novel features hereinafter described and claimed.

An object of the invention is to provide a diamond holding device adapted to be used for truing and dressing precision grinding wheels.

A further object of the invention is to provide new and improved means for securely clamping and holding the diamond carrying bar upon the base of the machine to which the device is applied. The said holding means also serves as means for clamping the diamond bar in the holder.

The parts and features are so arranged that the diamond holder may be placed upon the table of a machine directly in front of the grinding wheel, regardless of position of the wheel at the time it is necessary to true the wheel. It may be put on the machine while the wheel is running and without danger to the operator, thereby saving time as well as insuring safety.

In the accompanying drawing:—

Figure 1 is a side elevational view of the tool holder;

Figure 2 is a top plan view thereof;

Figure 3 is a transverse sectional view cut on the line 3—3 of Figure 1.

The diamond tool holder includes a clamping bolt 1 which passes transversely through a block 2. The said block is substantially L-shaped in side elevation and one end thereof is adapted to rest upon a machine base hereinafter referred to. A clamping nut 3 is screwed upon the bolt 1 and the block 2 is provided at its under side with an abutment 4 adapted to bear against the side of the head of the bolt and prevent the same from turning in the block when the nut is tightened thereon. The upper portion of the block 2 is formed with a longitudinally extending passage which receives a diamond holding bar 5. A binding collar is seated in the upper portion of the block and surrounds the bolt and is adapted to bear against the side of the bar 5 when the nut is tightened, so that the bar is secured and firmly clamped in the block.

The machine base 7 is provided with a shoulder 8 under which the head of the bolt 1 is adapted to engage and the block 2 is provided at its under side with a recess 9 which receives an edge portion 10 of the machine base. The opening which holds the bar 5 passes transversely through the upper portion of the recess 9, so that the lower side of the bar 5 may come in contact with the edge 10 when the nut 3 is tightened. When the head of the bolt 1 is inserted under the shoulder 8 and the edge 10 is received in the recess 11 and the nut 3 is tightened upon the bolt, the sleeve 6 is moved downwardly along the bolt whereby the bar 5 is clamped in the block. At the same time, the head of the bolt is drawn up tightly under the shoulder 8 and the recessed end portion of the block 2 is drawn down against the edge 10 and at the same time a portion of the edge 10 engages the lower side of the bar 5. Thus, the bar is securely held with relation to the block and the block and the bar are fixed with relation to the machine base.

Since the construction hereinbefore set forth is capable of a certain range of change and modification without materially departing from the spirit of the invention, I do not limit myself to such specific structure except as hereinafter claimed.

I claim:—

1. A tool holder comprising a block substantially L-shaped in cross section and provided at its under side with an abutment, said block having a passage, a tool bar located in said passage, a sleeve seated in the block and disposed transversely of the passage, a bolt passing through the sleeve and the block and having its head engaging the abutment and a nut screwed upon the bolt and adapted to force the sleeve toward the bar.

2. A tool holder comprising a block having a longitudinally extending passage, a tool bar located in said passage, the block being provided at one end with a recess, said bar passing transversely through said recess, a bolt passing transversely through the block, a sleeve seated in the block and adapted to engage the bar and a nut screwed upon the bolt and adapted to engage the sleeve to force the same in contact with the bar.

3. A tool holder comprising a block substantially angular in side elevation and provided at its under side with a depending abutment, said block having a passage extending longitudinally therethrough, said block being formed at one end with a recess extending transversely of and intersecting said passage, a bolt passing transversely through the block and having a head engaging said abutment, a tool bar located in said passage, a sleeve seated in the block and surrounding the bolt and a nut screwed upon the bolt and adapted to engage the sleeve and force the same in contact with the tool bar.

4. A diamond tool holder comprising an L-shaped member formed to provide a longitudinally extending horizontal portion and a depending abutment inward of and parallel to the depending end of the L-shaped member, the longitudinal portion having a passage extending longitudinally therethrough, a tool bar located in said passage, a bolt passing transversely through the member at one side of the tool bar, a sleeve surrounding the bolt, the longitudinally extending portion of the member having a seat concentric to the bolt within which the sleeve is seated, said sleeve being adapted to engage the bar, and a nut screwed upon the bolt and adapted to engage said sleeve.

5. The combination with a base having an upstanding, longitudinally extending portion formed with a rib and having an overhanging flange spaced above the upper face of the base, of a tool holder comprising an L-shaped member formed to provide a portion adapted to rest upon said rib and a depending portion, said first named portion having a longitudinally extending passage and the under face of said portion having a recess to receive the rib and intersecting said passage, a bolt passing downward through said member and having a head at its lower end adapted to engage the flange of the base, a tool bar extending longitudinally through the passage, a member on the bolt adapted to engage the tool bar, and a nut on the bolt adapted to engage said member.

6. The combiantion with a base having an upstanding longitudinally extending portion formed with a rib, of a tool holder comprising a block, substantially L-shaped in cross section, to provide a horizontal portion extending transversely across and resting upon said rib, and a depending portion resting at its lower end upon the base, said block having a longitudinally extending passage in the portion resting upon the rib, a tool bar located in said passage, a bolt passing downwardly through the block to one side of the tool bar, a head on the bolt having sliding engagement with the base, and means carried by the bolt for engaging said tool bar within the block and clamping the tool bar in adjusted positions, the block with the tool bar being longitudinally adjustable upon said base and rib.

In testimony whereof I hereunto affix my signature.

ERNEST S. RICHARDSON.